(12) United States Patent
Frahmann

(10) Patent No.: US 9,548,565 B2
(45) Date of Patent: Jan. 17, 2017

(54) CONNECTOR ELEMENT

(71) Applicant: LEONI KABEL HOLDING GMBH, Nuremberg (DE)

(72) Inventor: Arno Frahmann, Altenoythe (DE)

(73) Assignee: Leoni Kabel Holding GmbH, Nuremberg (DE)

( * ) Notice: Subject to any disclaimer, the term of this patent is extended or adjusted under 35 U.S.C. 154(b) by 0 days.

(21) Appl. No.: 14/976,911

(22) Filed: Dec. 21, 2015

(65) Prior Publication Data

US 2016/0111819 A1 Apr. 21, 2016

Related U.S. Application Data

(63) Continuation of application No. PCT/EP2014/062468, filed on Jun. 13, 2014.

(30) Foreign Application Priority Data

Jun. 21, 2013 (DE) .................. 10 2013 211 865

(51) Int. Cl.
*H01R 13/629* (2006.01)
*H01R 13/639* (2006.01)
*H01R 13/627* (2006.01)
*H01R 13/633* (2006.01)
*G02B 6/38* (2006.01)

(52) U.S. Cl.
CPC ............ *H01R 13/639* (2013.01); *G02B 6/387* (2013.01); *G02B 6/3821* (2013.01); *H01R 13/6275* (2013.01); *H01R 13/6335* (2013.01)

(58) Field of Classification Search
CPC .............. H01R 13/6273; H01R 13/629; H01R 13/6272

USPC ................... 439/352, 350, 351, 353–358
See application file for complete search history.

(56) References Cited

U.S. PATENT DOCUMENTS

| | | | | |
|---|---|---|---|---|
| 5,340,329 A | * | 8/1994 | Hirai ................ | H01R 13/6275 439/357 |
| 6,123,575 A | * | 9/2000 | Huang .............. | H01R 13/6273 439/352 |
| 6,655,978 B2 | * | 12/2003 | Lutsch .............. | H01R 13/641 439/310 |

(Continued)

FOREIGN PATENT DOCUMENTS

CN 202997192 U 6/2013
WO 2013030093 A2 3/2013

*Primary Examiner* — Gary Paumen
(74) *Attorney, Agent, or Firm* — Laurence A. Greenberg; Werner H. Stemer; Ralph E. Locher

(57) ABSTRACT

The connector element, in particular SFP connector, contains a locking mechanism for forming a lockable plug-type connection between the connector element and a mating piece. For this purpose, a locking element is formed. The locking element is mounted in rotatably movable fashion, wherein, in the case of actuation of an actuation element, in particular a pull tab, the locking element is rotated out of a locking position into an open position. In order to exert a restoring force for return to the locking position, a spring steel sheet is disposed which is supported on a housing part and which exerts a spring force on the locking element counter to the force brought about by the actuating element. Expediently, a plurality of spring lugs are formed which exert a spring force on the locking element in different directions.

18 Claims, 2 Drawing Sheets

(56) References Cited

U.S. PATENT DOCUMENTS

| | | | |
|---|---|---|---|
| 7,175,465 B1* | 2/2007 | Tsai | H01R 13/6275 |
| | | | 439/352 |
| 7,476,117 B1 | 1/2009 | Chen et al. | |
| 7,540,755 B1 | 6/2009 | Wu | |
| 9,118,149 B2 | 8/2015 | Kappla et al. | |
| 2005/0101176 A1* | 5/2005 | Kachlic | H01R 13/6275 |
| | | | 439/352 |
| 2006/0189197 A1* | 8/2006 | Reed | H01R 13/6275 |
| | | | 439/352 |
| 2007/0243749 A1* | 10/2007 | Wu | H01R 13/6584 |
| | | | 439/352 |
| 2008/0311781 A1* | 12/2008 | Wojcik | H01R 13/506 |
| | | | 439/352 |
| 2010/0112845 A1* | 5/2010 | Lam | H01R 13/6275 |
| | | | 439/352 |
| 2011/0267742 A1 | 11/2011 | Togami et al. | |
| 2012/0190223 A1* | 7/2012 | Wu | H01R 13/633 |
| | | | 439/152 |
| 2013/0115794 A1 | 5/2013 | Chang et al. | |
| 2015/0044897 A1* | 2/2015 | Wu | H01R 4/48 |
| | | | 439/352 |

* cited by examiner

CONNECTOR ELEMENT

CROSS-REFERENCE TO RELATED APPLICATION

This is a continuation application, under 35 U.S.C. §120, of copending international application No. PCT/EP2014/062468, filed Jun. 13, 2014, which designated the United States; this application also claims the priority, under 35 U.S.C. §119, of German patent application No. DE 10 2013 211 865.1, filed Jun. 21, 2013; the prior applications are herewith incorporated by reference in their entirety.

BACKGROUND OF THE INVENTION

Field of the Invention

The invention relates to a connector element, in particular to a so-called SFP connector element. A connector element of this type may be derived from international patent disclosure WO 2013/030093 A1, corresponding to U.S. Pat. No. 9,118,149, for example.

The connector element is a so-called flat connector having a locking mechanism, as is employed in particular in computer networks as an electrical or optical connector. Connector elements of this type are also known by the terms small form factor pluggable (SFP) or else quad small form factor pluggable (QSMP) and in terms of their geometric dimensions are determined by way of corresponding standards. Both a QSFP connector as well as an SFP connector element (also referred to as a CXP connector element) may be derived from the cited WO 2013/030093 A1.

The QSFP connector in principle is distinguished by an unlocking mechanism which is integrated in the side walls of the housing. To this end, a locking element which is of an approximate bracket shape and which in the rearward region of the connector housing is guided so as to be interdisposed between two housing halves is disposed here. Accordingly, the locking element has two locking arms which in the longitudinal direction extend in the side walls and on the end sides of which in each case one latch element which laterally projects beyond the locking arm is disposed.

As opposed to QSFP connector types of this sort, the latch element in the SFP connector types is configured on an upper side of the connector housing. In the case of the SFP connector according to international patent disclosure WO 2013/030093 A1, the locking element in its entirety is configured in the manner of a rocker onto which the latch element is molded in at the front end.

In order for the locking mechanism to be actuated, an actuating element which by manual pulling or rotating switches the locking element from a locked position to an unlocked position is typically disposed here.

In the case of WO 2013/030093 A1 the actuating element is configured as a pull lug which for unlocking is pulled in the longitudinal direction of the connector element. The locking element is configured in the manner of a rocker which has a front rocker arm having the latch element, and a rear rocker arm which interacts with a transverse web of the pull lug. Here, a helical spring for exerting the restoring force is disposed as a loose component in the region of the latch element. In a complementary manner, a helical spring pin which when rotated exerts an additional restoring force is guided as a mounting axle through the locking element.

As has already been mentioned, connectors of this type serve for connecting in particular data cables in computer networks to devices or else to distributors. Here, the installation space is often limited and the individual connectors are disposed beside one another in a very tight arrangement. In the interior the connectors have suitable electronics which are usually integrated on a circuit board. The circuit board having corresponding contacts at the same time also forms a contact tongue which at the end side at the front end of the connector housing is freely accessible and by way of which a plug contact to the respective component is configured.

The connectors in general are configured for repeated unlocking and locking. In order for reliable locking to be ensured again after unlocking, a restoring force is usually exerted by way of spring elements on the locking element, so as to return the latter back to the initial position or to reliably hold the latter therein, respectively. The initial position here corresponds to the locking position. Configuring and assembling the spring elements is associated with complexity and costs.

Proceeding therefrom, the invention is based on the object of ensuring reliable restoring or holding of the locking element to or in the initial position, respectively, in a connector element of this type, such as is known in particular from WO 2013/030093 A1, with low complexity.

SUMMARY OF THE INVENTION

The object is achieved according to the invention by a connector element having the features of the main claim. The connector element is in particular a so-called SFP connector. In the case of the SFP connector the locking element is rotatably mounted in the connector housing and has a latch element which for locking the connector element in a form-fitting manner is configured with a mating piece. In order for the locking element to be actuated, an actuating element which is configured in particular as a pull lug is provided. When the pull lug is pulled in the longitudinal direction of the connector, the pull lug acts on the locking element, so that the latter performs a rotation movement and switches from a locking position to an open position. In order for a restoring force to be exerted on the locking mechanism, so as to move the latch element back to the locking position after unlocking, or to reliably hold the latch element in the locked position, respectively, a spring steel sheet which is supported at least indirectly on one of the housing parts as a counter bearing is now disposed in the housing. The spring steel sheet exerts a spring force which is counter to the force initiated by the actuating element, that is to say the force initiated by the pull lug, on the locking element. The spring steel sheet here is fixedly connected to the one housing part, for example by way of rivets or screws. Preferably, the spring steel sheet here is the only spring element which acts on the locking mechanism and which exerts the required restoring force. The spring steel sheet is thus interdisposed between the locking mechanism and the housing. The spring steel sheet expediently covers the locking mechanism here, that is to say the locking element and the region of interaction between the actuating element and the locking element, across the majority of the area. The spring steel sheet in its entirety is thus configured in the manner of a covering for the locking mechanism.

On account of this design embodiment, manufacturing of the spring steel sheet is simple and cost-effective, on the one hand. Moreover, assembly is also comparatively simple, since the spring steel sheet during assembly may be fastened to a housing part and there are, therefore, no loose parts.

Expediently, the spring steel sheet here contains a first spring lug which exerts a first restoring force which is counter to the rotation movement of the locking element, when the pull lug is pulled. The first spring lug bears on the locking element and upon actuation is outwardly deflected together with the latter. The outward deflection here is performed in particular in a vertical direction. The first spring lug here preferably projects from a peripheral side of a base plate of the spring steel sheet, wherein this base plate is configured in particular for fixing to the housing part.

The locking element is expediently configured in the manner of a rocker and contains a (rotary) mounting bolt as well as a rocker arm on which the latch element is configured. The first spring lug now is disposed in such a manner so as to act on the rocker arm and specifically on that side that is opposite the latch element, such that restoring acts in the direction toward the locked position.

In order for secure guiding of the first spring lug which only bears loosely on the rocker arm to be ensured, in an expedient design embodiment a molded contour as a counter-bearing face for the first spring lug is configured on the rocker arm, in particular at the end thereof.

In one preferred embodiment, the spring steel sheet has a second spring lug which exerts a second restoring force which is counter to the actuation direction, that is to say in particular counter to the pulling direction of the pulling lug, of the actuating element. Therefore, the spring steel sheet, in particular in combination with the first spring lug, to this extent offers double action and has two distinct regions with dissimilar spring action. On account of the integration of these two spring lugs on the spring steel sheet, a particularly simple and compact construction and also correspondingly simple assembly are enabled. The second spring lug here in particular exerts a restoring force in the longitudinal direction. The two spring lugs thus exert restoring forces in different directions. Fastening of the spring steel sheet on the housing part so as to prevent displacement of the spring steel sheet is of particular significance in particular for exerting the second restoring force. A particular advantage of integrating the second spring lug on the spring steel sheet is to be seen in that the spring steel sheet in itself forms a counter-bearing for the second spring lug, so to speak, such that a separate spring element which extends in the longitudinal direction may be dispensed with.

The actuating element expediently has a transverse bracket which is oriented so as to be transverse to the longitudinal direction and which for exerting the second restoring force is engaged from behind by the second spring lug. The transmission of force from the actuating element to the locking element is usually performed indirectly or directly via the transverse bracket. Since this transverse bracket is engaged from behind by the second spring lug on that side that faces away from the locking element, the pull lug is again pushed in the direction of the initial position, so that the locking element is pushed in to the locking position thereof. On account thereof, the first spring lug which acts directly on the locking element, is thus imparted support. Overall, reliable and secure returning or secure holding of the locking element to or in the locked position, respectively, is thus ensured on account thereof. In order for this engagement from behind of the transverse bracket to be enabled, the second spring lug here is configured as a downwardly elbowed lug on the rear end which is oriented toward the actuating element.

The second spring lug here has a bent and resilient vertical leg which extends in the vertical direction and which is adjoined by a likewise preferably bent and resilient transverse leg which for exerting the second restoring force acts on the actuating element, in particular the transverse bracket.

In particular, only one centric vertical leg which on either side is adjoined by in each case one transverse leg is configured. On account thereof, resilient support preferably across the entire or almost the entire width of the transverse bracket is achieved. At the same time the peripheral regions of the spring steel sheet which are lateral to the vertical leg remain free and available for further functions.

Indeed, the spring steel sheet at that end thereof that is oriented toward the actuating element expediently has a stop for the actuating element. To this end, the spring steel sheet at the end side is bent in particular in an approximate L-shape. Expediently, two bent-back stops are configured here so as to be lateral to the vertical leg. By way of these stops movement of the actuating element, that is to say in particular of the pull lug and in particular of the transverse bracket of the pull lug, is limited to a minimum. This stop here is placed such that the latch element is located in the unlocked position. The spring steel sheet is thus assigned a further function, namely a stop function.

Expediently, the spring steel sheet has at least one, preferably two half-bearings in which the mounting bolt of the rotatably mounted locking element is rotatably mounted. The mounting for the mounting bolt here is preferably configured by interaction of the half-bearings of the spring steel sheet with corresponding half-bearings on the connector housing. This allows particularly simple assembly, since the locking element having the mounting bolt needs only to be inserted into half-bearings and, on account thereof, is pre-fixed in the assembled position. By integrating the half-bearing in the spring steel sheet, at least the one housing part is simplified, and no half-bearings have to be configured thereon.

The two half-bearings of the spring steel sheet here are configured on mutually opposite sides by bending back a lateral lug of the spring steel sheet.

Expediently, the locking element contains a transverse stop which for transmitting the movement of the actuating element to the locking element is engaged from behind by an unlocking lug of the actuating element. In particular, this unlocking lug, together with the transverse bracket, forms a clearance or a receptacle pocket, the transverse stop reaching thereinto and lying loosely therein. When the pull lug is pulled, the transverse stop by way of this unlocking lug is outwardly deflected in the longitudinal direction, wherein on account of the mounting of the locking element by way of the mounting bolt the rotation movement is performed, such that the transverse stop in the receptacle pocket is slightly tilted away. Conversely, during the corresponding restoring movement the transverse stop is also pressed into the initial position again by the transverse web.

Expediently, the transverse stop here is disposed in the vertical direction above the mounting bolt. The transverse stop to this extent configures a rotation lever for exerting the rotation movement for the locking element, this lever arm extending in the vertical direction. The transverse stop, which forms the lever arm, and the rocker arm are in particular thus disposed so as to be at an angle of 90° in relation to one another.

Expediently, the spring steel sheet also covers the transverse stop and the unlocking lug, wherein the spring steel sheet to this end has a trough, the transverse stop and the unlocking lug extending thereinto. The trough here in the longitudinal direction is of sufficiently large size so as to enable movement of the unlocking lug and of the transverse stop when actuated.

With a view to a design embodiment which in terms of construction is as simple as possible, the spring steel sheet is expediently configured as a punched-and-bent part. Furthermore, the locking element is preferably an integral component, preferably a casting or a die-casting, in particular made from metal. The locking element is preferably an integral zinc die-casting. Therefore, the rocker arm, the mounting bolt, and the transverse stop are a single contiguous molded part.

Other features which are considered as characteristic for the invention are set forth in the appended claims.

Although the invention is illustrated and described herein as embodied in a connector element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Parts with identical function are provided with identical reference signs in the figures.

Figure 1:
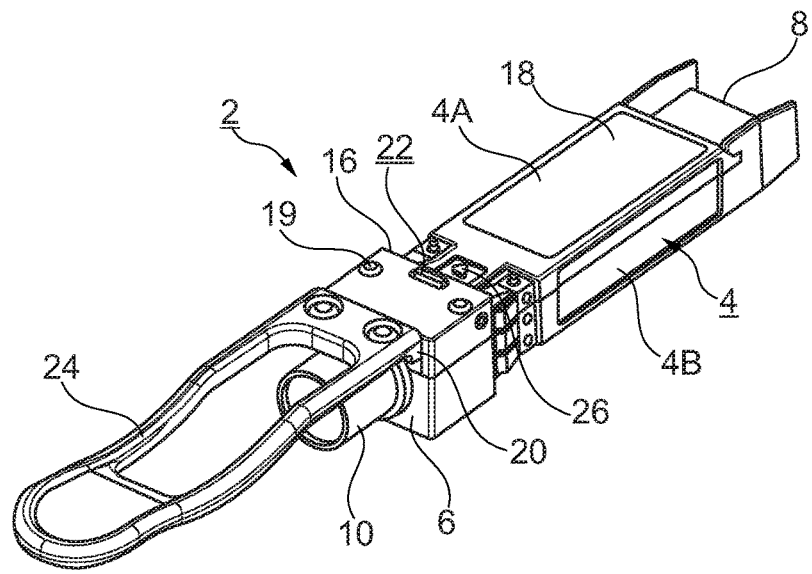
FIG. 1 is a diagrammatic, perspective view of a connector element according to the prior art.

The connector element 2 which is known from WO 2013/030093 and which is illustrated in FIG. 1 is configured as an SFP connector. The connector element 2 has a dual-shell connector housing 4 having an upper part 4A and a lower part 4B, and in the longitudinal direction extends between a rear end wall 6 and a front end side 8. A cable opening 10 for a cable to be introduced is configured on the rear end wall 6. The front end side 8 has an opening for a plug-contact element which is formed by a circuit board. The connector housing 4 in the rear region has a housing step 16, on account of which the height but not the width of the connector is restricted. A front region which adjoins the housing step 16 forms a connector region 18 by way of which the connector element 2 in the plugged state is plugged into a corresponding mating piece for contacting. The two housing parts 4A, 4B are preferably connected exclusively in the rear region by way of fastening rivets 19.

The longitudinal direction is generally defined as the direction of extent from the rear end wall 6 to the front-side end side 8; a transverse direction is defined as the direction of extent which is perpendicular thereto from a left to a right side wall (width), and the vertical direction is defined as the direction of extent which is perpendicular to the longitudinal direction and to the transverse direction, from the lower side of the housing to the upper side of the housing (height).

A pull lug 24 which may only be actuated in the longitudinal direction without rotation being possible adjoins the rear end wall 6. The pull lug 24 serves for manually actuating a locking element 22 which has a latch element 26 which is configured in the manner of a projecting nose. The latch element 22 is disposed on an upper side of the connector housing 4 in the connector region 18. Moreover, the connector housing 4, for shielding purposes, is surrounded by an EMI cage in the region of the latch element 26.

Figure 2:
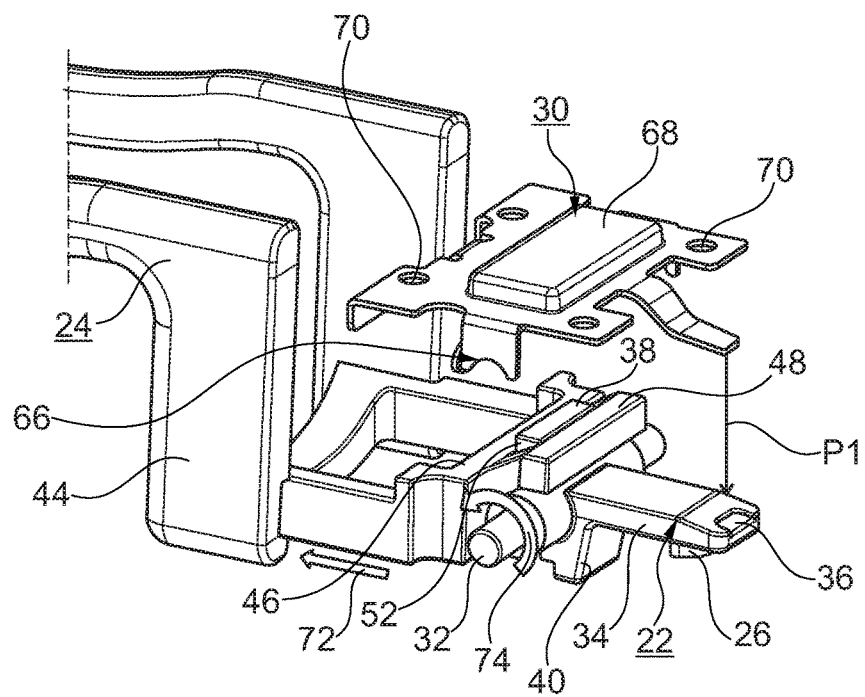
FIG. 2 is an exploded perspective illustration of a locking mechanism for the connector element, having a pull lug, a locking element, and a spring steel sheet according to the invention.
Figure 3:
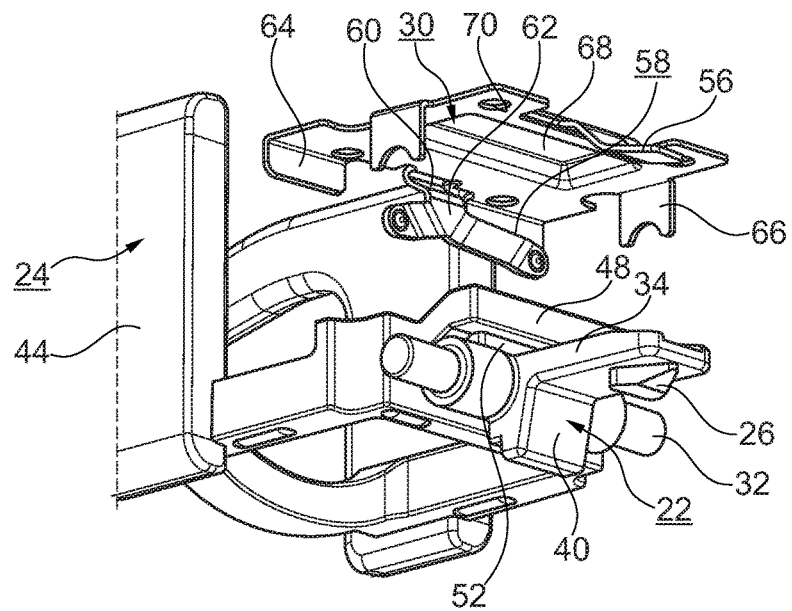
FIG. 3 is a further exploded perspective illustration of the locking mechanism according to FIG. 2.
Figure 4:
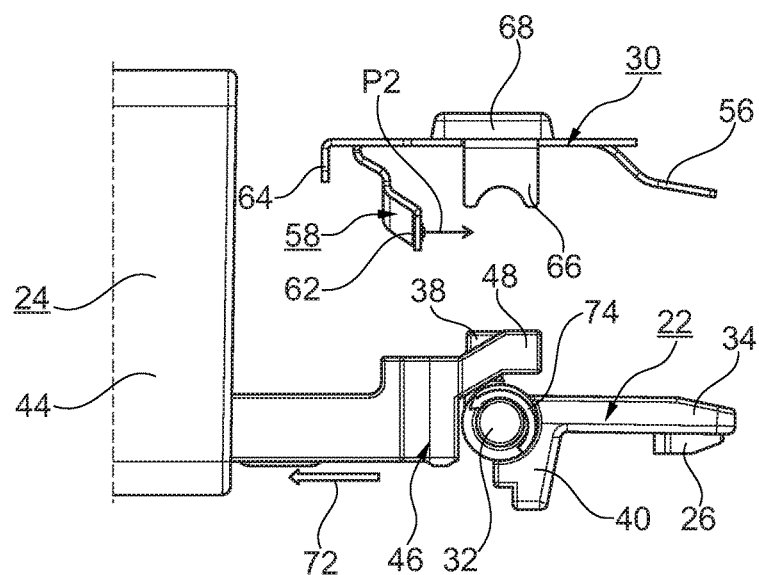
FIG. 4 is an exploded, side view of the locking mechanism according to FIG. 2.

When the pull lug 24 is manually pulled, the longitudinal movement of the pull lug 24 is converted into a rotation movement of the locking element 22, so that the latch element 26 is moved downward from a locking position to an unlocked position in which removal of the connector element 2 from a corresponding interface connector in a device is enabled. The locking element 22 and in particular the latch element 26 are pushed by a spring force into the locking position. To this end, the locking mechanism displays the construction illustrated in FIGS. 2 to 4.

The locking mechanism 22 contains the pull lug 24, the locking element 22, and a spring steel sheet 30. In particular, the locking mechanism is formed by these three components in interaction with the two housing parts 4A, 4B. The locking element 22 is configured in the manner of a rocker as an integral and in particular as a zinc die-cast component, and contains a mounting bolt 32 which in the longitudinal direction is adjoined by a rocker arm 34, the latch element 26 being molded onto the upper side thereof. Opposite the latch element 32 the rocker arm 34 has a molded contour 36 which is configured as an approximately U-shaped clearance and is open toward the end side of the rocker arm 34.

A transverse stop 38 which for exerting the rotation movement interacts with the pull lug 24 is configured so as to be oriented in the vertical direction to the mounting bolt 32. A central web 40 which likewise extends approximately in the vertical direction is molded in the manner of an L-shaped elbow on the opposite upper side. As can be derived in particular from the side view of FIG. 4, the central web 40 and the transverse stop 38 are disposed so as to be somewhat mutually offset in the longitudinal direction, wherein a flat side of these two elements in each case at least substantially lies within a vertical plane which extends through a rotation axis which is formed by the mounting bolt 32.

The mounting bolt 32 has two mutually opposite bolt parts by way of which the actual rotatable mounting is performed. The mounting bolt 32 in the exemplary embodiment in the center has a thickening on which the further elements, namely the rocker arm 34, the transverse stop 38, and the central web 40 are molded.

The pull lug 24 in the exemplary embodiment has two vertical arms 44 which in the initial position (locking position) by way of front flat sides bear on the rear end wall 6. The pull lug 24 by way of a front frame-like part-region extends into the connector housing 4. In this front part-region the pull lug configures a transverse bracket 46 which extends in the transverse direction and which is adjoined by an unlocking lug 48. The unlocking lug 48 here has two side arms which are laterally guided past the transverse stop 38 and are interconnected by way of a transverse arm. A receptacle pocket 52 formed by a cut-out in which the transverse stop 38 loosely lies is configured between the transverse arm and the transverse bracket 46.

In order for the restoring force to be exerted, the spring steel sheet 30 which in principle is configured so as to be plate-shaped, having an approximately plate-shaped base part, is disposed on the locking mechanism. The spring steel sheet 30 in the longitudinal direction toward the front on the one side thereof has a first spring lug 56 which is bent in the direction toward the rocker arm 34 and which in the vertical direction exerts a spring force on the rocker arm 34, as is illustrated by the arrow P1. The first spring lug 56 here is molded so as to be centric on the plate-shaped base part, and in the assembled final position by way of the end side thereof lies in the molded contour 36, such that the first spring lug 56 is held so as to be form-fitting in the transverse direction.

In the longitudinal direction, at the opposite end, the spring steel sheet 30 has a second spring lug 58 which is initially configured in the vertical direction by way of an elbow, specifically likewise again in the direction toward the locking element 22. As can be derived in particular from FIG. 3 in combination with FIG. 4, the second spring lug 58 is configured by a vertical leg 60, which is configured so as to be angled and bent, and by a transverse leg 62 adjoining thereto, which extends laterally to both sides of the vertical leg 60 in the transverse direction. The transverse leg 62 in a final assembled position bears on a rear side of the transverse bracket 46 that faces away from the locking element 22, and exerts a restoring force in the direction of the arrow P2 on the transverse bracket 46.

At the end that faces away from the locking element 22, the spring steel sheet 30 furthermore has a two-part stop 64 which is formed by an elbow and which delimits movement of the pull lug in the longitudinal direction. The stop 64 thus overlaps the transverse bracket 46 in the vertical direction.

Furthermore, on the side parts two opposite lugs are bent in the direction of the mounting bolt 32, the lugs displaying semicircular-shaped clearances and on account thereof configuring half-bearings 66 for mounting the mounting bolt 32.

Finally, the spring steel sheet 30 in the central region thereof has a trough 68 molded in the plate-shaped base part. The trough 68 forms a receptacle space, the transverse stop 38 of the locking element 22 together with the transverse arm 50 of the unlocking lug 48 extending thereinto and being received there in a space-saving manner.

Finally, the spring steel sheet 30 in the exemplary embodiment also has a plurality of fastening holes 70 by way of which the former is fastened to one of the housing parts 4A, 4B, namely in particular to the lower part 4B which is disposed so as to be opposite the locking element 22. Fastening here is performed by rivets or screws, for example. Alternatively, to this end also only bolts, which in the assembled position are push-fitted into the fastening holes and thereby cause form-fitting in the longitudinal direction, are molded on the housing part 4B. In the vertical direction, the spring steel sheet 30 is clamped between the two housing parts 4A, 4B and the intermediate layer of the locking element 22. On account thereof, the spring steel sheet 30 is altogether held on the housing 4 in a reliable and locationally fixed manner.

The locking mechanism functions as now described. Proceeding from the basic initial position in which the locking mechanism is in the locked position, the pull lug 24 is manually pulled in the pulling direction 72, the latter corresponding to the longitudinal direction. On account thereof, the transverse stop 38 is conjointly moved by way of the transverse arm of the unlocking lug 48. On account of the rotatable mounting of the locking element 22, rotation in the rotation direction 74 of the locking element is initiated, such that the latch element 26 is drawn into the interior of the housing in the vertical direction and thus releases the connector element 2. During this movement of the rocker arm 34, the first spring lug 56 is outwardly deflected counter to the direction of the arrow P1. At the same time, the second spring lug 58 is likewise outwardly deflected counter to the direction of the arrow P2. Therefore, the two spring lugs 56, 58 exert a spring force on the rocker arm 34 in the vertical direction and on the transverse bracket 46 in the longitudinal direction, and thus subjected to alternating support push the locking element 22 back to the initial position as soon as the pull lug 24 is released. In this restoring movement, the transverse bracket 46 here pushes on the transverse stop 38 so as to actuate the locking element 22 again counter to the rotation direction 74.

The particular advantage of the spring steel sheet 30 is in particular to be seen in the multi-functional design embodiment thereof, in which a plurality of spring functions as well as an integrated mounting function have been implemented by way of only a single component. On account thereof, a simple and cost-effective construction has been achieved. Moreover, by way of the design embodiment of a component which is to be connected to the housing in a locationally fixed manner, simple assembly is also enabled. On account thereof, the overall diversity of parts is reduced.

The following is a summary list of reference numerals and the corresponding structure used in the above description of the invention:

2 Connector element
4 Connector housing
4A Upper part
4B Lower part
6 Rear end wall
8 Front end side
10 Cable
12 Housing step
18 Connector region
19 Fastening rivet
22 Locking element
24 Pull lug
26 Latch element
30 Spring steel sheet
32 Mounting bolt
34 Rocker arm
36 Molded contour
38 Transverse stop
40 Central web
44 Vertical arm
46 Transverse bracket
48 Unlocking lug
52 Receptacle pocket
56 First spring lug
58 Second spring lug
60 Vertical leg
62 Transverse leg
64 Stop
66 Half-bearing
68 Trough
70 Fastening hole
72 Pulling direction
74 Rotation direction
P1 Arrow
P2 Arrow

The invention claimed is:

1. A connector element of a flat-connector type for data lines in networks, the connector element comprising:
 a connector housing extending in a longitudinal direction and having two housing parts including an upper part and a lower part;
 a locking mechanism for configuring a lockable plug connection to a mating piece, said locking mechanism having a locking element and an actuating element disposed outside said connector housing and is connected to said locking element being at least partially and rotatably disposed within said connector housing, said locking element having a latch element for unlocking and locking the connector element in a form-fitting manner in relation to the mating piece, a rotational movement of said locking element being initiated when said actuating element is actuated and said locking element changes from a locking position to an open position; and a spring steel sheet being at least indirectly supported on one of said housing parts and exerting a spring force on said locking element and is counter to a force which is initiated by said actuating element.

2. The connector element according to claim 1, wherein said spring steel sheet has a first spring lug which exerts a first restoring force which is counter to the rotational movement of said locking element.

3. The connector element according to claim 2, wherein said locking element is a rocker having a mounting bolt and a rocker arm, said latch element is disposed on said rocker arm, and said first spring lug acts on said rocker arm.

4. The connector element according to claim 3, wherein said rocker arm has a molded contour as a counter-bearing face for said first spring lug.

5. The connector element according to claim 2, wherein said spring steel sheet has a second spring lug which exerts a second restoring force which is counter to an actuation direction.

6. The connector element according to claim 5, wherein said actuating element has a transverse bracket which is oriented so as to be transverse to the longitudinal direction and which for exerting the second restoring force is engaged from behind by said second spring lug.

7. The connector element according to claim 5, wherein said second spring lug has a rear end configured with a downwardly elbowed lug which is oriented toward said actuating element.

8. The connector element according to claim 5, wherein said second spring lug has a bent and resilient vertical leg which is adjoined by a transverse leg which for exerting the second restoring force acts on said actuating element.

9. The connector element according to claim 1, wherein said spring steel sheet has an end that is oriented toward said actuating element and said end has a stop for said actuating element.

10. The connector element according to claim 3, wherein said spring steel sheet has at least one half-bearing in which said mounting bolt of said locking element is rotatably mounted.

11. The connector element according to claim 1,
    wherein said locking element has a transverse stop for transmitting a movement of said actuating element to said locking element;
    further comprising an unlocking lug, said transverse stop is engaged from behind by said unlocking lug; and
    further comprising a receptacle pocket, said transverse stop lies in a loose manner in said receptacle pocket.

12. The connector element according to claim 11, wherein said spring steel sheet has a trough, said transverse stop and said unlocking lug extending into said trough.

13. The connector element according to claim 1, wherein said spring steel sheet is a punched-and-bent part.

14. The connector element according to claim 1, wherein said locking element is an integral component.

15. The connector element according to claim 1, wherein:
    the connector element is a small form factor pluggable connector; and
    said actuating element is a pull lug movable in the longitudinal direction.

16. The connector element according to claim 2, wherein said spring steel sheet has a second spring lug which exerts a second restoring force which is counter to a pulling direction of said actuating element.

17. The connector element according to claim 3, wherein said spring steel sheet has at least two half-bearings in which said mounting bolt of said locking element is rotatably mounted.

18. The connector element according to claim 1, wherein said locking element is a cast part.

* * * * *